Figure 1:
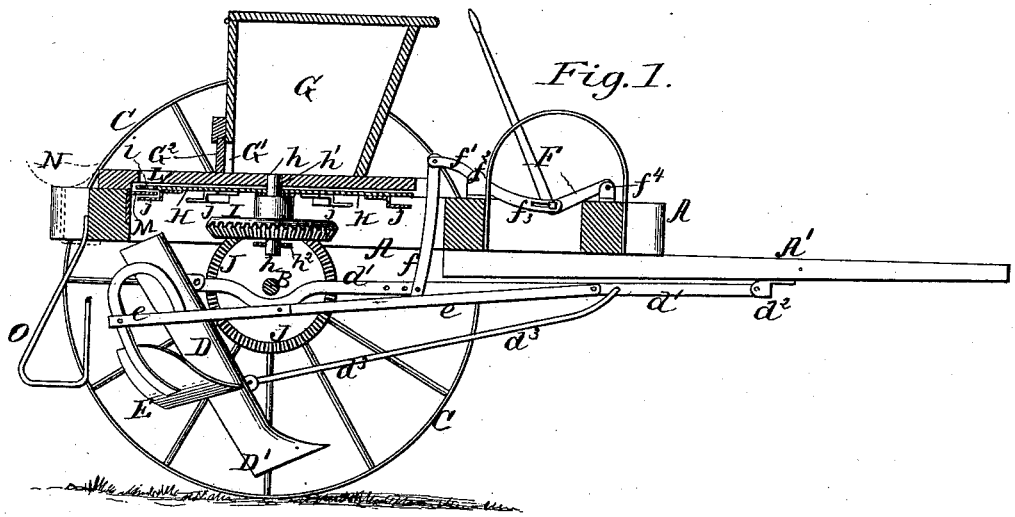

(No Model.)  2 Sheets—Sheet 1.
J. P. VAN VLECK.
POTATO PLANTING MACHINE.
No. 349,242. Patented Sept. 14, 1886.

Witnesses:
B. S. Hoxie
Cora B. Hoxie

Inventor
John P. Van Vleck (No Model.) 2 Sheets—Sheet 2.

J. P. VAN VLECK.
POTATO PLANTING MACHINE.

No. 349,242. Patented Sept. 14, 1886.

Witnesses:
Robt. L. Fenwick
Van Buren Hillyard

Inventor:
John P. Van Vleck,
by Johnson & Johnson
Att'ys

N. PETERS. Photo-Lithographer, Washington, D. C.

UNITED STATES PATENT OFFICE.

JOHN P. VAN VLECK, OF COOKSVILLE, WISCONSIN.

POTATO-PLANTING MACHINE.

SPECIFICATION forming part of Letters Patent No. 349,242, dated September 14, 1886.

Application filed October 24, 1885. Serial No. 180,864. (No model.)

*To all whom it may concern:*

Be it known that I, JOHN P. VAN VLECK, a citizen of the United States, residing at Cooksville, in the county of Rock and State of Wisconsin, have invented new and useful Improvements in Potato-Planting Machines, of which the following is a specification.

My improved potato-planter embraces a suitable frame, upon the top of which is secured a box or hopper for holding the supply of potatoes to be planted, a plow or furrow-opener and covering-blades suspended from beneath the frame, and adapted to be adjusted or thrown in and out of operation, and a revolving knife or cutting-disk for cutting the potatoes into sections as they are fed from the hopper to the planting-tube, which disk is mounted beneath the hopper and driven by suitable gears from the supporting-axle of the machine. The frame rests upon suitable ground-wheels keyed to an iron axle, and is drawn by a team hitched to a pole at the front of the machine.

Heretofore the operation of planting potatoes has almost universally been performed by hand, the potatoes first being divided into sections and stored until needed, when, after proper furrows were opened in the land, they were dropped by hand in the rows and then covered, either by hand-hoes or a hoe coverer. The objection to this method, aside from the great amount of labor involved therein, is that the potatoes were liable to become injured by sweating or bleeding after being cut, this being true whether, as has also been practiced, the potato-cuts be planted by hand or machines, which machines at the same time also opened a furrow and closed the same after planting. To obviate these objections is therefore the aim and object of this my improvement, and the result thereof is, that a machine operated by horse-power is produced which carries a supply of potatoes to be planted, and in which the operations of opening the furrow, cutting the potatoes into sections, and dropping the fresh cuts at regular intervals of about a foot apart into said furrow, and then covering them, and at the same time marking the position of the next succeeding row, is performed continuously as the machine is drawn over the ground. The labor incident to potato-planting is therefore reduced to a minimum, and there is no liability of injury to the cuts prior to planting the same, for the operation of cutting and planting occurs simultaneously.

For a better understanding of the details of construction and operation of my invention reference must now be had to the accompanying drawings, in which similar letters of reference indicate like parts in the several views.

Figure 2:
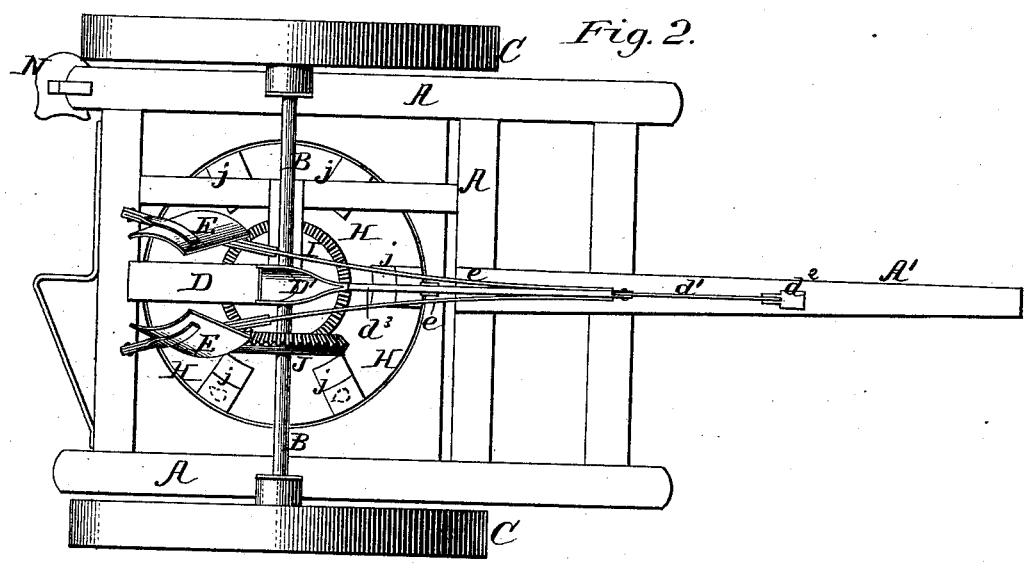
Figure 3:
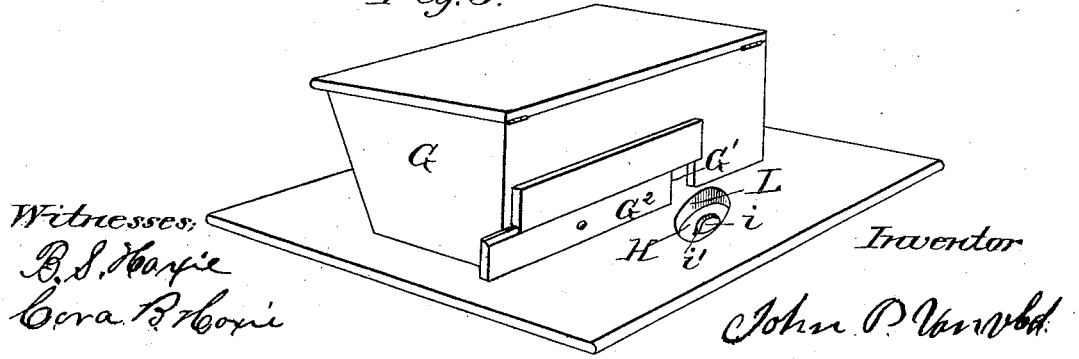
Figure 4:
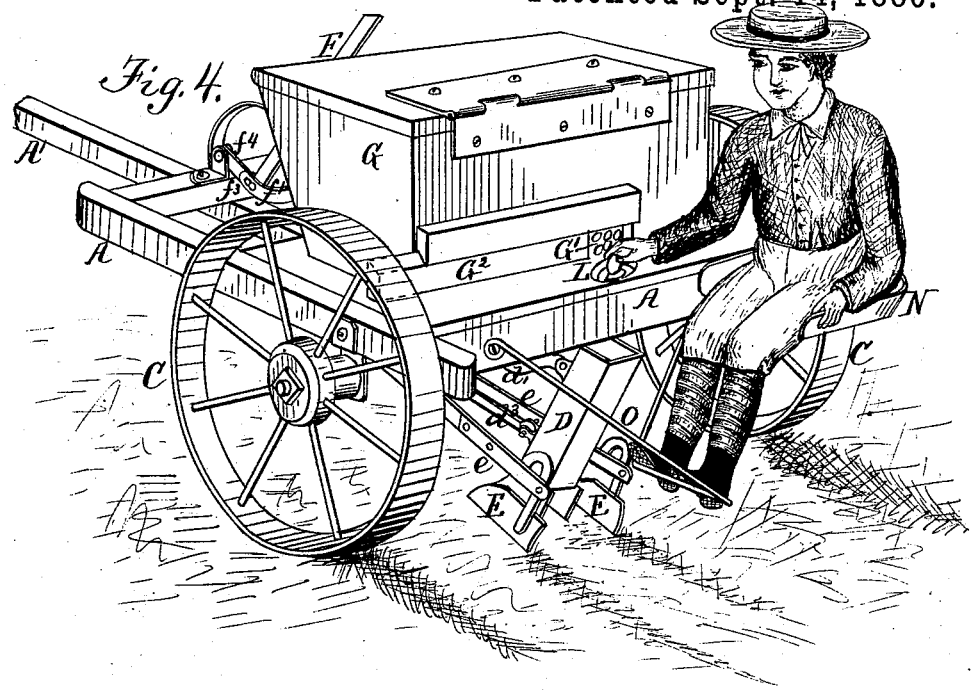
Figures 5, 6:
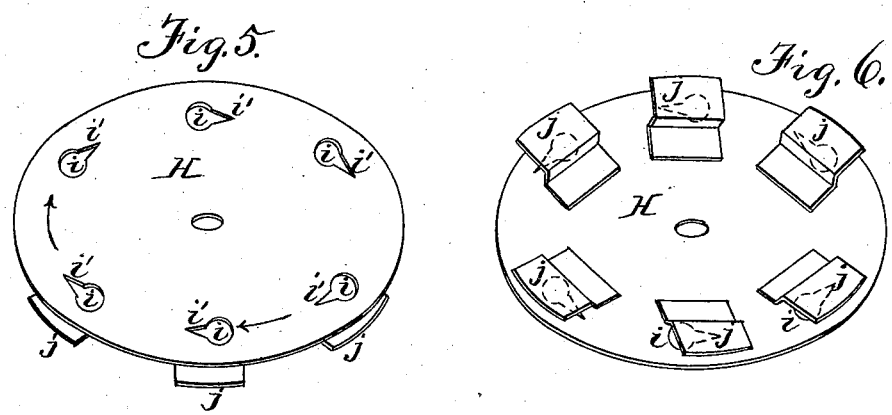
Figure 7:
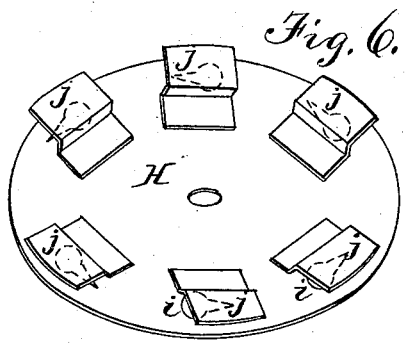

Figure 1 represents a vertical central sectional elevation with the furrow opening and closing devices shown as raised out of operation; and Fig. 2, an inverted plan or bottom view of a potato-planter constructed according to my invention. Fig. 3 is a detailed enlarged view of the hopper, looking from the rear thereof, and showing the slide therein and opening in the platform of the machine to the cutter-blade beneath. Fig. 4 is a perspective view of the entire machine, showing the same as in operation. Figs. 5 and 6 illustrate detached enlarged views of the revolving cutter, showing the construction of the same, Fig. 5 being the top, and Fig. 6 the bottom. Fig. 7 is a detached sectional view through the cutter, showing a potato in position about to be severed by the cutter.

A is a frame of suitable shape and size, carrying at its front a pole, A', for the attachment of the team, and supported upon an iron axle, B, to each end of which the supporting-wheels are keyed.

D is the planting-tube, which has a furrow-opener, D', at its end, this tube being similar to the drills of seed-planters, and pivoted at its top to a rod, $d'$, which is pivoted, as at $d^2$, to the forward end of the frame or pole. At the lower end of this tube D is also pivoted a rod, $d^3$, whose outer end is pivoted to the rod $d'$.

E E represent the covering-blades, situated just in the rear of the furrow-opener D', and adjacent to each side thereof, supported by rods $e$ $e$, whose forward ends are pivoted to the rod $d'$ of the feeding-tube. Thus it will be seen the entire planting and covering devices are connected together and act in unison, and may be simultaneously raised out of operation or lowered into action by a rod, $f$, pivoted to the rod $d'$, and extending upward and connected at its top end to a short horizontal arm, $f'$, pivoted, as at $f^2$, to the top of the frame of the machine, and slotted at its outer end, as at $f^3$, and connected to a bell-crank hand-lever, F, also pivoted upon the top of the frame, as at $f^4$, and extending upward in position accessible to the driver's seat.

G is the hopper for carrying the supply of potatoes to be planted, which also serves as a seat for the driver, and is secured upon the platform of the machine. At the rear side of this hopper is an opening, G', closed by a sliding door, $G^2$. Centrally beneath this hopper, upon the under surface of the platform of the machine, is the cutter-disk H, for dividing the potatoes into cuts for planting as they come from the hopper. This cutter consists of a circular plate, H, keyed to the central shaft, $h$, whose bearings are in the platform of the machine, and in a bracket secured beneath the frame A, as seen at $h'$ and $h^2$, respectively. This shaft $h$ carries a beveled gear, I, which meshes with a similar gear, J, on the iron axle B, whereby, the supporting-wheels C being rigidly keyed to said axle, the proper rotary motion is imparted from said axle to the cutting-blade.

As shown in Figs. 5 and 6, and as before stated, the cutter is composed of a circular plate, H, through which, near its outer edge, is formed a series of openings, $i$, and beneath which, immediately over the position of said openings, are secured stops $j$, Figs. 1, 5, 6, and 7, which consist of a piece of metal of angular form, one end of which is secured to the plate, and the other projects over the hole therein. The object of these pieces or, more properly, stops $j$ is to limit the insertion or passage of the entire potato through the openings in the cutter-blade, and the degree of angularity of these pieces, or the distance of the stops from the under face of the plate, is such that when a potato occupies the hole in said plate or cutter-blade and rests upon the stops the desired size section of the potato to produce a proper cut will be cut therefrom; and to effect this cutting of the potato the edges of the opening in the revolving plate are made sharp and with a forward slit, as seen at $i'$, Fig. 5.

L is the opening through the platform communicating from the hopper-opening G' to the cutter, and M, Figs. 1 and 7, is a stop or projection acting between the cutter-blade and the stops $j$, to eject the section of potato after it has been severed by the knife from the stop $j$ of the latter.

N is the seat, and O the foot-rest for the attendant or dropper.

The operation is as follows: The furrow-opener and coverers being first set to the required depth for planting, and a supply of whole potatoes being placed into the hopper, the machine is drawn across the field to be planted, commencing at one edge thereof. The team is directed by the driver, who sits upon the top of the hopper and at whose command is the hand-lever F, for throwing out of operation the plow, &c., when going to or from the field or turning around at the ends thereof, and at the rear of the machine, upon the seat N, is the attendant whose duty it is to feed or pass the potatoes continuously from the hopper through the opening G' at the rear thereof, and enter them in the opening L in the platform, so that they will enter in the holes in the cutter-wheel and be severed thereby. The revolution of the cutter-blade severs the potato into the proper-sized cuts, which cuts, as severed, are swept from the stops $j$ by the fixed piece M into the planting-tube, whence they are conducted to the bottom of the furrow, and covered by the covering-blades E following thereafter.

As before stated, the furrow-opener and covering-blades are made adjustable, so as to regulate the depth of planting and covering, and the holders in the cutter-blade are made the desired distance apart—say about twelve inches—so as to sever and drop a cut at about this distance in the rows. The opening L in the platform, to receive the potato from the hopper, is made with a beveled or sloping edge, Fig. 7, adjacent the hopper, so as to facilitate the entrance therein of the potatoes, while the outer end is made square or perpendicular, so as to form a bearing, against which the potato is held while being cut. The marking for the succeeding row is effected by the outer wheel, which is placed at the required distance from the planting-tube for this purpose.

I claim—

1. The combination, in a potato-planting machine embracing the frame A and hopper G G', and suitable furrow opening and closing devices and planting-tube, of the circular cutter-plate having openings $i$ and stops $j$, revolving horizontally beneath the hopper by connection with the axle of the machine, and a fixed stop, M, as and for the purposes described and shown.

2. In a potato-planting machine, the horizontally-revolving cutter formed of a circular plate or disk having openings through the same near its outer edge, and stops beneath said openings, and a fixed co-operating stop, as and for the purposes described and shown.

3. In a potato-planting machine, the hopper G, having an opening, G', and sliding door $G^2$ in the rear side, combined with the platform of the machine, having an opening therein and a horizontally-revolving cutter placed beneath the said platform, as described and shown.

4. The combination, with the hopper G G', platform of the machine, having a feeding-opening, L, therein, and horizontally-revolving cutter H, having openings and a stop for each opening, of the planting-tube D D', for conducting the severed cuts of the potato to the furrow, as described and shown.

5. In a potato-planter, the platform of the machine having the seat N and foot-rest O for the feeder, and opening L for feeding the potatoes to the cutter, combined with a hopper having an opening at its bottom rear portion adjacent to the opening in the platform, and a revolving cutting-wheel, as described and shown.

6. In a potato-planter, the platform having an opening, L, therein, combined with a wheel or disk having holes through the same, whose edges are formed to cut a section from the potato, and provided with stops $j$ upon its under side opposite its holes for retaining the potato in position to be acted upon by the cutter-disk, as shown and described.

7. The combination, in a potato-planter, of a supply-hopper and a platform having a feeding-opening, L, with a cutting-wheel having a series of openings, $i$, formed in a circle, and a stop-plate, $j$, for each opening, and a stop, M, fixed in the frame in a plane between the cutting-plate and its stop-plates, substantially as described, for the purpose specified.

8. In a potato-cutting device consisting of the revolving circular plate H, having the openings $i$, and an open stop-plate, $j$, for each opening on the under side of said plate, a coöperating fixed stop, M, arranged in the frame in a horizontal plane between the revolving plate and its open subjacent stop-plates, and a platform having a feeding-opening, L, substantially as described, for the purpose specified.

JOHN P. VAN VLECK.

Witnesses:
 CORA B. HOXIE,
 B. S. HOXIE.